United States Patent [19]
Kelly

[11] Patent Number: 5,555,847
[45] Date of Patent: Sep. 17, 1996

[54] DOG DIAPER

[76] Inventor: Wanda M. Kelly, RR 4, D-727 Ammon Road, Moncton, NB, Canada, E1C 8J8

[21] Appl. No.: 500,171

[22] Filed: Jul. 10, 1995

[30] Foreign Application Priority Data

Jul. 11, 1994 [GB] United Kingdom .................. 9413956

[51] Int. Cl.⁶ .................................................. A01K 13/00
[52] U.S. Cl. ........................................ 119/850; 604/385.1
[58] Field of Search .................................. 119/850, 854; 54/79.1, 79.2, 79.3, 79.4; 604/358, 385.1

[56] References Cited

U.S. PATENT DOCUMENTS

| | | | |
|---|---|---|---|
| 3,211,132 | 10/1965 | Hersh | 119/850 X |
| 3,817,217 | 6/1974 | Matuka et al. | 119/95 |
| 3,943,930 | 3/1976 | Schaar | 604/385.1 |
| 4,095,562 | 1/1978 | Graham | 119/95 |
| 4,560,380 | 12/1985 | Tharel | 604/385.1 |
| 4,577,591 | 3/1986 | Wesseldine | 119/850 |
| 4,769,023 | 9/1988 | Goebel et al. | 604/385.1 |
| 4,813,949 | 3/1989 | O'Rourke | 604/391 |
| 4,893,587 | 1/1990 | Bailey, Jr. | |
| 4,969,419 | 11/1990 | Fong | 119/95 |
| 5,146,874 | 9/1992 | Vidal | 119/95 |
| 5,226,386 | 7/1993 | Thoma | 119/95 |
| 5,234,421 | 8/1993 | Lowman | 604/385.1 |
| 5,315,960 | 5/1994 | Lamp | 119/95 |

*Primary Examiner*—Robert P. Swiatek
*Assistant Examiner*—Elizabeth Shaw
*Attorney, Agent, or Firm*—Anthony Asquith & Co.

[57] ABSTRACT

The diaper is disposable, being made of inexpensive waterproof plastic sheet material. The sheet is formed to a Z-fold, and stitched along its marginal edges. The pocket thus formed is open to the area beneath the dog's tail, for receiving solid excrement. A stitched-in absorbent pad extends forwards from the pocket, and receives liquid excrement. The action of assembling the diaper to the dog is effective to open the mouth of the pocket, and to press the diaper against the dog. The diaper is secured around the dog by means of Velcro tabs. Straps passing forward and around the dog's neck hold the diaper in place. The diaper includes a tail-hole, whereby the diaper is located in place on the dog.

17 Claims, 8 Drawing Sheets

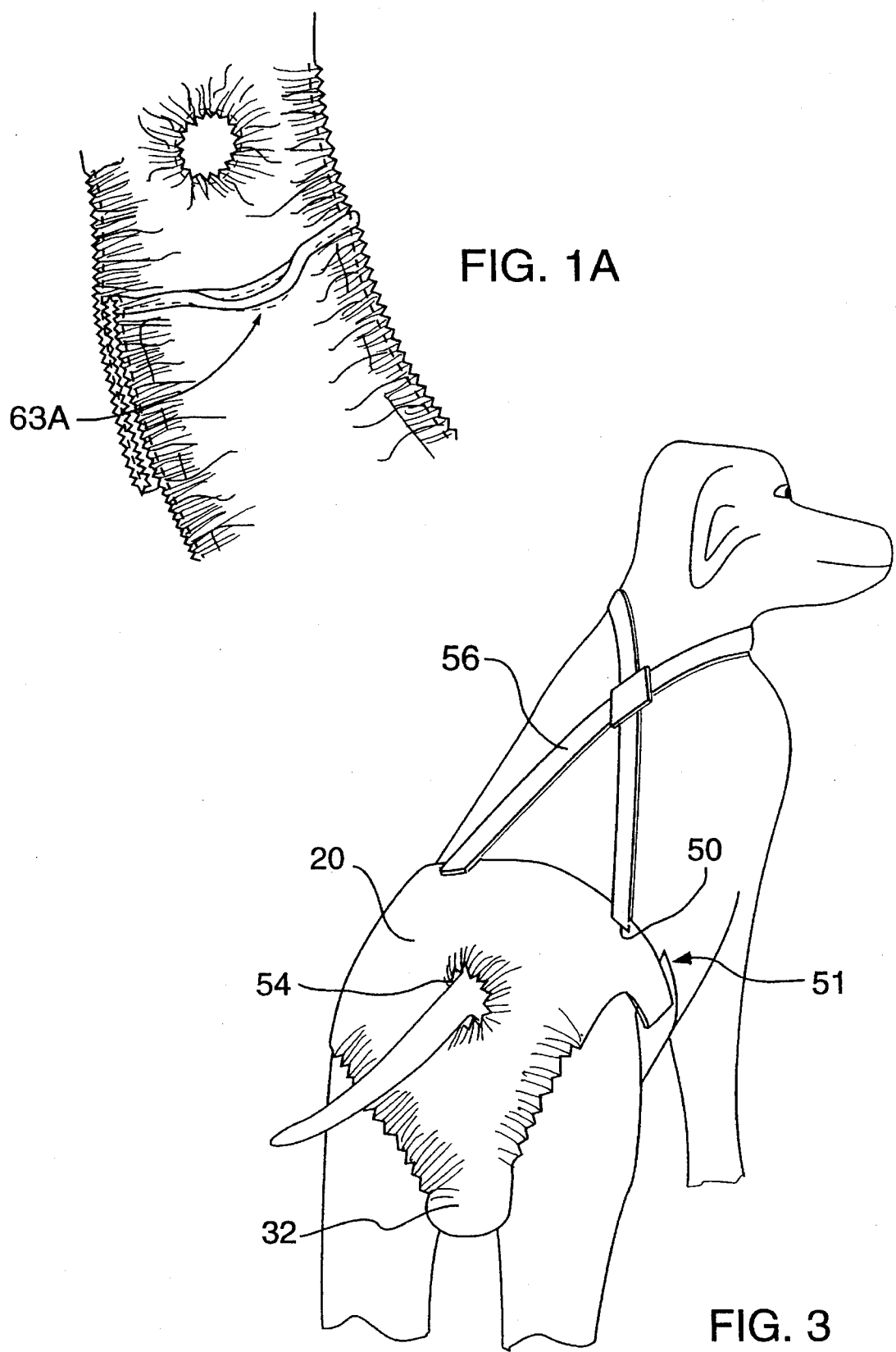

DOG DIAPER

BACKGROUND TO THE INVENTION

It is becoming increasingly unacceptable, and in some jurisdictions illegal, for pet-owners to allow their dogs to foul footpaths, sidewalks, and public places. Several systems have been proposed for assisting the owner in the task of picking up the dog's solid excrement, and of carrying the excrement away for subsequent disposal.

These systems have involved apparatus such as scoops, bags, etc, which are carried by the owner. The owner uses the apparatus to scoop up and collect the excrement after the dog has deposited the excrement on the ground.

It may be surmised that one of the reasons these systems have not had universal acceptability is that the owner is required to take direct action to pick up the excrement from the ground. The act of scraping or scooping the excrement into a container, it seems, is too distasteful.

GENERAL FEATURES OF THE INVENTION

The invention lies in a disposable dog diaper. The diaper is secured around the dog's body using Velcro, straps, etc as will be described.

The diaper is so manufactured as to create a pocket, when the diaper is secured around the dog. The pocket is open-mouthed, the mouth being so positioned as to receive solid excrement excreted from the anal region of the dog.

The pocket is loose and baggy, but preferably the lip of the pocket is stiffer, by virtue of which the lip is pressed against the skin of the dog, below the anal region. The mouth of the pocket remains open, while the lip is pressed against the dog, with the result that the solid pieces of excrement drop into the pocket, substantially without smearing.

When the diaper is removed from the dog, the nature of the diaper is such that the person removing the diaper can gather up the ends of the material of the diaper with the solid pieces of excrement still contained in the pocket, and the person does not have to run the risk of touching the solid piece of excrement, nor even of feeling the solid pieces of excrement through the material of the diaper. As will be seen, the pocket may be formed simply by doubling over the material of the diaper into a Z-fold, and by stitching the marginal edges. The lines of stitching define the extent of the pocket.

A diaper with a pocket formed in this manner can be manufactured very cheaply, and economy of manufacture is important, of course, in a disposable diaper. The disposable item comprises an inexpensive piece of waterproof plastic, and some simple, and easily automated, stitching. Some inexpensive absorbent padding may be added in some embodiments.

THE INVENTION IN RELATION TO THE PRIOR ART

The prior art in the field of dog-diapers includes the following patent publications.

U.S. Pat. No. 3,817,217 (1974, Matuka)
U.S. Pat. No. 4,095,562 (1978, Graham)
U.S. Pat. No. 4,813,949 (1989, O'Rourke)
U.S. Pat. No. 4,969,419 (1990, Fong)
U.S. Pat. No. 5,146,874 (1992, Vidal)
U.S. Pat. No. 5,226,386 (1993, Thoma)
U.S. Pat. No. 5,315,960 (1994, Lamp)

It is clear from this prior art that disposable diapers for dogs have not previously been proposed. Diapers with disposable receptacles are known, but, as will be described, that is really not good enough for dog diapers. Disposable diapers for human babies are of course well-known, and the dog-diaper as described herein follows some of the constructional techniques of the human diaper, including the use of thin waterproof plastic sheeting, and the use of thick padding to absorb liquid excrement, in some embodiments. However, the dog-diaper inevitably differs as to its shape, and manner of operation, as compared with a human diaper.

DETAILED DESCRIPTION OF PREFERRED EMBODIMENTS

By way of further explanation of the invention, exemplary embodiments of the invention will now be described with reference to the accompanying drawings, in which:

FIG. 1A is the same view as FIG. 1 of a modification to the diaper;

FIG. 3 is a pictorial view of the diaper of FIG. 1, shown assembled onto a dog;

The apparatuses shown in the accompanying drawings and described below are examples which embody the invention. It should be noted that the scope of the invention is defined by the accompanying claims, and not necessarily by specific features of exemplary embodiments.

Figure 1:
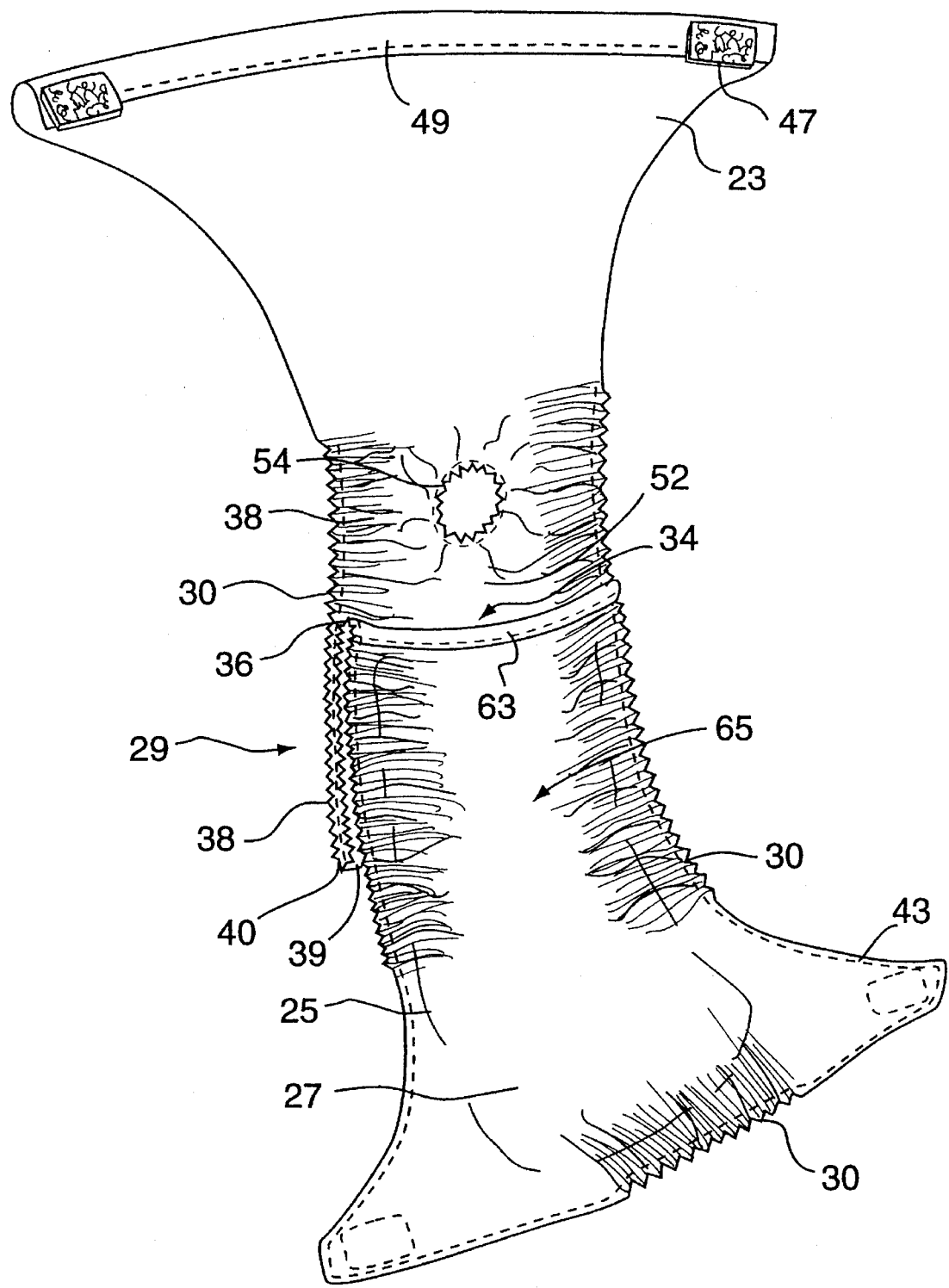
FIG. 1 is a view of a dog-diaper that embodies the invention, shown in the as-manufactured condition.

As shown in FIG. 1, the diaper 20 includes a sheet 23 of thin, plastic, waterproof, material. In this instance, the sheet is 0.11 mm thick, and made of polyethylene. Polyethylene can be obtained down to about 0.08 mm thick, but that is a little too flimsy for a practical diaper. Thicker sheet would be uneconomical.

The diaper includes also a thick pad 25 of conventional super-absorbent sponge or padding material, and a cover 27 of thin fabric, which is porous and permeable (i.e through which liquid may pass freely).

The waterproof sheet 23 is folded, during manufacture of the diaper, into a Z-fold, as shown at 29 in FIG. 1. The sheet is stitched along its margins, as at 30, to lock in the Z-fold, thereby forming a pocket 32.

The pocket 32 comprises has an open mouth 34, defined as the space between the upper fold 36 of the Z-fold 29 and the underlying area 38 of the plastic sheet 23.

Between the marginal lines 30 of stitching, the pocket 32 is free. The depth of the pocket is defined as the distance of the intermediate area 39 of the sheet 23 lying between the upper fold 36 and the lower fold 40 of the Z-fold 29.

Figure 2:
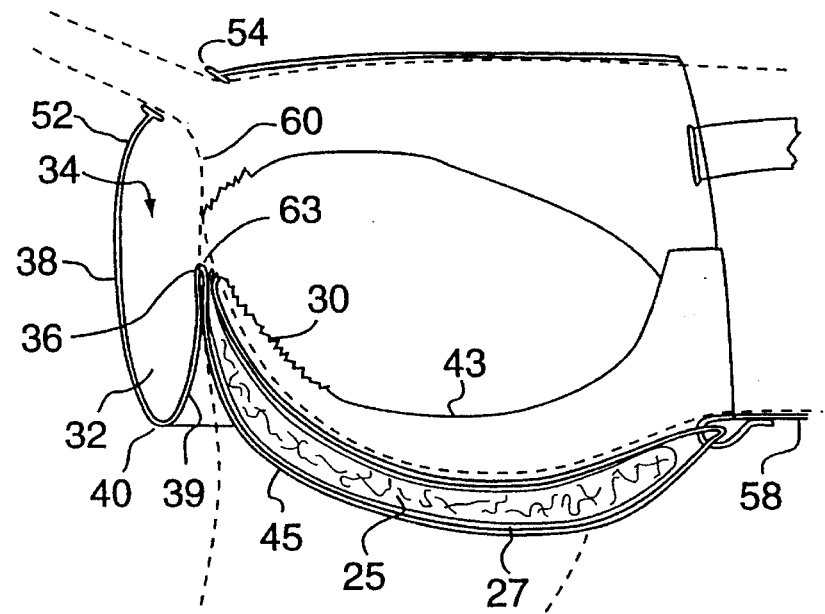
FIG. 2 is a cross-section of the diaper, the diaper being assembled onto a dog.

The Z-fold, and the manner in which the Z-fold gives rise to the open-mouthed configuration of the pocket, is shown in FIG. 2.

The lines of stitching as shown at 30 are done with elastic thread, whereby, after the stitching is finished, and the material released, the elastic contracts, and the material under the stitches forms itself into pleats or gathers. The elastic stitching is shown by numeral 30; stitching with ordinary non-elastic thread is shown by numeral 43.

The permeable fabric cover 27 overlies the whole area 45 of the plastic sheet 23 which lies forward of the upper fold 36. The cover 27 is stitched to the area 45 all round its circumference. Some portions of the total length of the stitching are elastic, some are non-elastic.

The pad 25 of absorbent material is sandwiched between the area 45 of the plastic sheet 23 and the permeable cover 27. The pad may be stitched in place to stop it bunching or moving; or the pad may simply be placed between the sheet and the cover before the two are stitched together.

Figure 4:
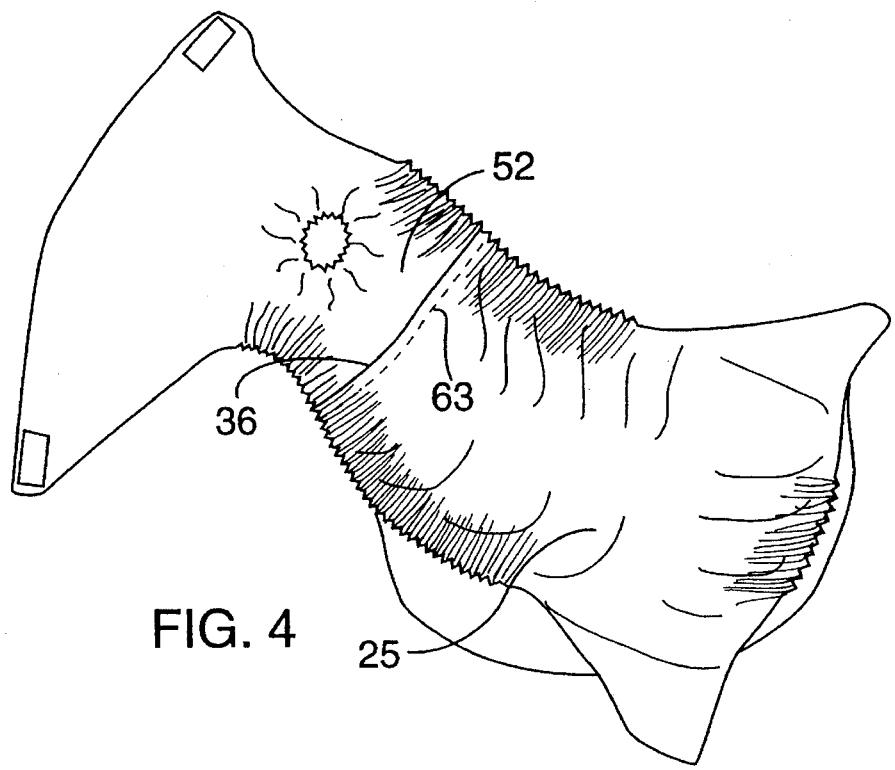
FIG. 4 is another view of the diaper of FIG. 1.

FIG. 4 shows the effect of the elastic thread. The diaper naturally assumes a hollowed-out configuration in the area of the absorbent pad, and the plastic sheet naturally becomes highly folded and loose around the mouth 34 of the pocket 32.

Patches 47 are shown stitched into the corners of the diaper. The patches 47 are of a pressure-sensitive or peel-and-stick adhesive, or, for example, of Velcro. The patches are used for securing the diaper around the dog. Extra strength may be built in around the patches by doubling over the waterproof sheet to form a hem 49. Tie-tapes may be provided, for use instead of Velcro patches. The requirements of economical mass-production should be considered in selecting the most appropriate type of fastener.

The waterproof material is not knitted or woven, and therefore the hem 49 is not needed as a means for preventing the edge from fraying. However, the waterproof material is very thin, and consequently is not very strong. The waterproof material in fact, for acceptable economy, must be just barely thick enough that the material can be classed as waterproof; such thin material is easily damaged, and might be rather vulnerable around the fixing patches if not reinforced by doubling over, as provided by the hem 49.

The diaper 20 is held in place with straps 56, and the straps pass through slots 50 in the waterproof material: again, these slots preferably should be in the hemmed area 49 of the sheet 23 where the material is doubled over. Alternatively, the straps may be attached after the diaper has been Velcro'd or tied in place, and the straps may in that case be looped around the bridge area 51, at which the extremities of the sheet are brought together.

Just above the mouth 34 of the pocket 32, the area 52 of the sheet 23 is formed with a tail-hole 54. The tail-hole 54 is stitched around with elastic thread; when the elastic contracts, the waterproof material around the tail hole becomes puckered and folded.

In use of the diaper, as shown in FIG. 3 the tail of the dog is passed through the tail-hole 54, and the diaper is secured around the dog's waist using the securement patches 47. Straps 56 are attached from the slots 50, and the straps run forwards and are secured around the dog's neck. The straps 56 may be tailored or adjusted for the particular dog, or the straps may be of elastic, whereby one size of strap fits many sizes of dog.

It may be noted that although the diaper is intended to be disposable, it is intended that the straps may be retained, and re-used. In fact, the straps, or at least a forward portion of the straps, may be permanently built into the dog's leash-harness. Disposable straps are contemplated, but economy will generally dictate that non-disposable straps be used, i.e that the straps be retained for re-use.

Straps 56 that run along the dogs back are easy to put on, and may be all that is needed in many cases. However, a strap 58 that runs underneath the dog's chest, although more difficult to put on, is favoured also, or instead, because, if such a strap is present, the control of the fit of diaper to the dog is much enhanced. The front end of the strap 58 is stitched to the neck loop of the strap 56.

The pocket 32 of the diaper serves the purpose of receiving solid pieces of excrement of solid excrement from the dog. As such, the designer should aim for the following.

1. It is important that the area 52 of the plastic sheet material just above the pocket should stand a small distance away from the dog's skin (i.e hair), at least in the area 60 immediately underneath the tail opening 54; if this area of the plastic material were pressed against the skin, smearing of the excrement over that area would be likely.
2. It is important that the mouth 34 of the pocket should be wide open in the front-rear sense, at least during the time when the dog is excreting.
3. It is important that the upper fold 36 which constitutes a lip 63 of the mouth 34 of the pocket, should rest against the dog's skin or hair; if there were a gap between the lip 63 and the dog's skin at this location, there is a chance that the solid piece of excrement might fall through this gap, and not into the pocket.

The designer should see to it that the solid piece of excrement will drop into the pocket 32, and remain secure in the pocket until the pet-owner can remove the diaper and dispose of same. Thus, the solid piece of excrement should drop straight into the pocket, touching neither the area 52 of the sheet 23, nor the lip 63 of the pocket. There should be no smearing of any of the plastic sheet material outside the pocket.

The lip 63 of the pocket tends to be drawn forwards with respect to the dog when the diaper is assembled onto the dog. The geometry of the diaper, and the tension from the straps, help to pull the lip forwards. The chest strap 58, if one is provided, is helpful also in drawing the lip 63 forwards. This pulling of the lip forwards has two effects: the pulling tends to draw the mouth 34 of the pocket open, and at the same time tends also to press the lip against the skin of the dog.

The pulling forward of the lip of the pocket is more efficacious if the lip is stiff. The lip may be stiffened by ensuring that the absorbent material is present in the lip area, and is stitched in in such a manner as to be effective to add bulk to the lip area.

Also, the lip may be doubled over or folded over, as a measure for stiffening the lip, as shown in FIG. 1A. The lip 63A may be secured in the doubled-over configuration in the centre by appropriate stitching. This shaping of the lip, especially when the lip is stiffened by the presence of the padding within the lip, again is effective in holding the pocket open, and in forcing the lip against the body of the dog.

While the designer should aim to make the lip stiff, the designer should, in contrast, aim to make the area 52, and the pocket itself, very loose and baggy. The more loose and baggy this area is, the more the pocket 32 tends to stand off from the dog.

The pad area 65 of the diaper below (i.e forward of) the pocket 32 has the characteristic that the edges of the area 65 are crinkled due to the elastic thread used for the stitching 30. The crinkled edges make the pad area adopt a bowl-shape, and the bowl-shape tends to make the lip curl forwards. The crinkled edges therefore serve as another mechanism for bringing the lip 63 of the pocket into touching contact with the dog's skin.

As may be seen from the drawings, the diaper 20, though sophisticated in concept, is of an easy-to-manufacture character, requiring only simple stitching operations. The diaper is made from the same materials, and by the same processes, from which conventional human disposable diapers are made, which, as is well known, are cheap enough to be disposable. The diaper as described is very easy to use (for the pet-owner, as well as for the pet) in that the solid pieces of excrement are collected in the baggy pocket, and remain therein while the dog continues with its walk. The pet-owner does not have to collect the solid pieces of excrement into a container, and then carry the container in his hand: the dog in fact carries the solid pieces of excrement.

At the end of the dog's outing, the solid pieces of excrement are still in the pocket, and remain there during disassembly of the diaper from the dog. The person finds it an easy matter then to discard the disposable diaper, without any chance of touching the solid piece of excrement directly, and without feeling the solid piece of excrement through the thin plastic material, which many owners would find distasteful. Of course, once the pocket contains solid pieces of excrement, and before the diaper is removed, the dog should be dissuaded from sitting down upon the pocket, and from indulging in other activities which might cause smearing.

One of the critical aspects of performance of a pet-excrement collector lies in the manner in which the person removes the excrement-containing item, and transports the excrement-containing item to the garbage bin or other disposal facility. In this regard, it may be regarded that it is a disadvantage if the item to be taken off the dog, and to be carried in the person's hands, is small. The person is much more comfortable in manipulating the excrement-containing item, and transporting the item, if the item is large; or rather, not simply large, but has extremities by means of which the person can grasp the excrement-containing item.

In the present case, the person is not required to carry out a task of disassembly or removal of detachable excrement-containing pockets from some kind of a permanent garment; an operation which, if it were required, might well lead (occasionally) to the excrement being contacted. In the present case, the whole garment is removed in one piece. Furthermore, the garment is grasped by its extreme corners during disassembly from the dog, in order to peel off the Velcro fasteners. The person's hands are far removed from the excrement-containing areas while manipulating the Velcro fasteners.

In the case of the design of diaper as described, the person may detach the diaper, and may convey the diaper to a garbage bin, and at all times the person's fingers remain several centimeters from the actual excrement. It is most unlikely that the extremities, where the Velcro patches are located, could become soiled and smeared, even if the dog should be boisterous. After the diaper is removed, the person may hold the diaper by its four extremities.

Also, in the present case, it may be noted that the excrement can be expected to remain invisible during the whole disposal operation.

It is recognised that the dimensions of the diaper are important for the best performance of the diaper. The diaper may be sold in three or four sizes; small, medium, large, extra large. For the medium size, typical dimensions are:

overall length: 60 cm (the contraction of the elastic thread means that the working length of the diaper is much less than this);
length of padded area: 28 cm;
width, padded end: 30 cm; width, tail end: 33 cm;
width at pocket: 20 cm;
distance from tail-hole to lip of pocket: 5 cm.

Although stitching has been described as the manner of attaching the various components and areas of the diaper together, other fastening means are contemplated. For example, conventional heat-welding to make seams in polyethylene is quite simple, and can be adapted for automated mass-production. It is even possible to maintain the gathering/bunching feature with heat-welding. However, the gathering is not essential, although gathering does serve to pre-bias the diaper to the shape of the dog, ready for when the diaper is assembled to the dog.

It may be that some pet-owners might feel some embarrassment in allowing their dog to appear in public in what is so obviously a diaper. To alleviate this, the diaper may be covered with a garment such as pants or shorts. Clothing for dogs has been proposed previously, but pants-type garments have really never been accepted—because, it may be suggested, the designer has to provide cut-outs so the garment will not be contaminated by the dog's excrement, with the result that the final garment turns out to be hardly more than a back-jacket.

However, in the present case, the diaper serves to keep dog's clothing items from becoming contaminated with excrement, and therefore there is much more freedom to select items of clothing for the dog. Now, pants-type garments become much more viable. The dog's macho image can be maintained, even though the dog is wearing a diaper, if the diaper is covered with suitable pants or shorts. Of course, dressing the dog in shorts is not every owner's desire, but the point is that the use of the diaper as described permits the wearing of shorts, should the owner so wish.

Pants or shorts, if provided, may be suspended using the same straps as the diaper. In the case where the straps holding the diaper are secured around the bridge area 51, suitable slots or holes may be provided in the pants garments, at the waist, and the forward-extending straps passed therethrough. The chest strap 58, if provided, may be used also to support the pants.

Figure 5:
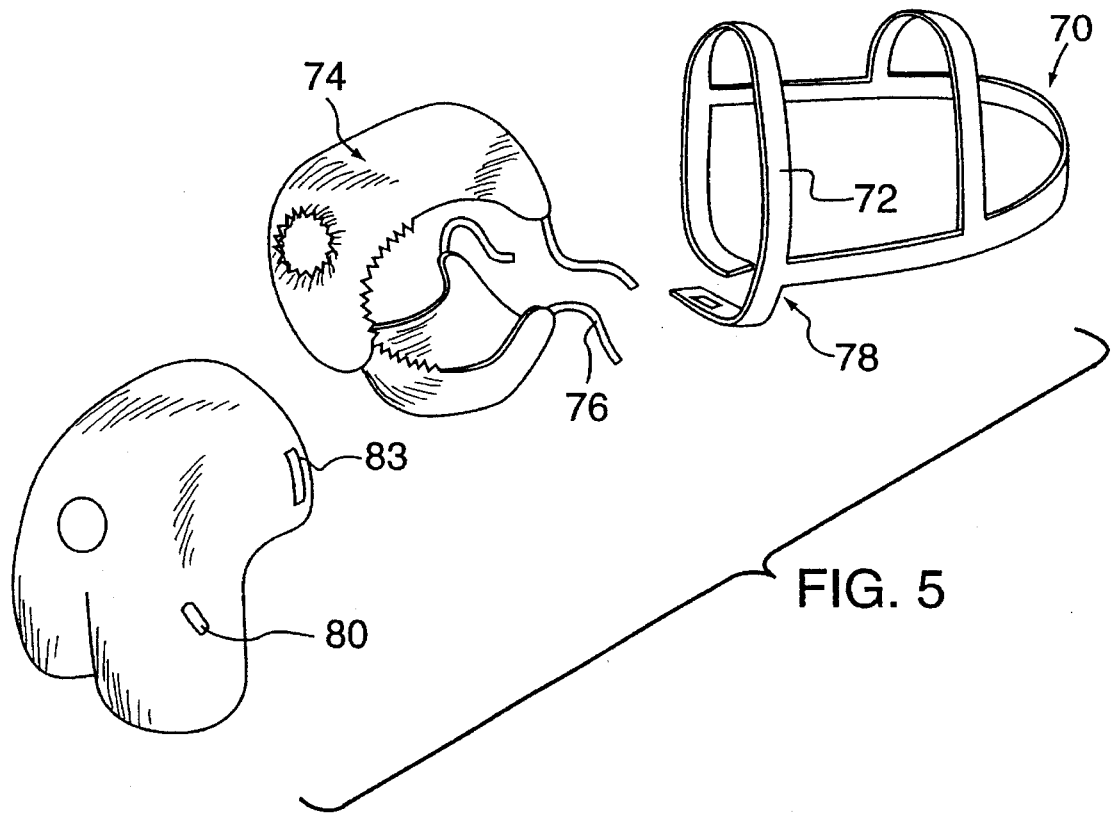
FIG. 5 is a pictorial view of a diaper and associated components.

FIG. 5 shows a harness 70, which is slipped over the head of the dog, and secured by means of the strap 72 around the dog's waist. The diaper 74 is secured by means of tie-tapes 76, which are tied around the bridge area 78 of the harness. A pants-type garment 80 may be secured by its own separate tie-tapes, or by passing the tie-tapes 76 through a slot 83.

Instead of the tie-tapes 76, the sides of the diaper may be pre-stitched together, whereby the diaper itself forms what may be regarded as a pair of pants. In this case, to maintain snugness of fit with different dogs, panels of stretchy elastic material are stitched into the sides of the diaper.

Figure 6:
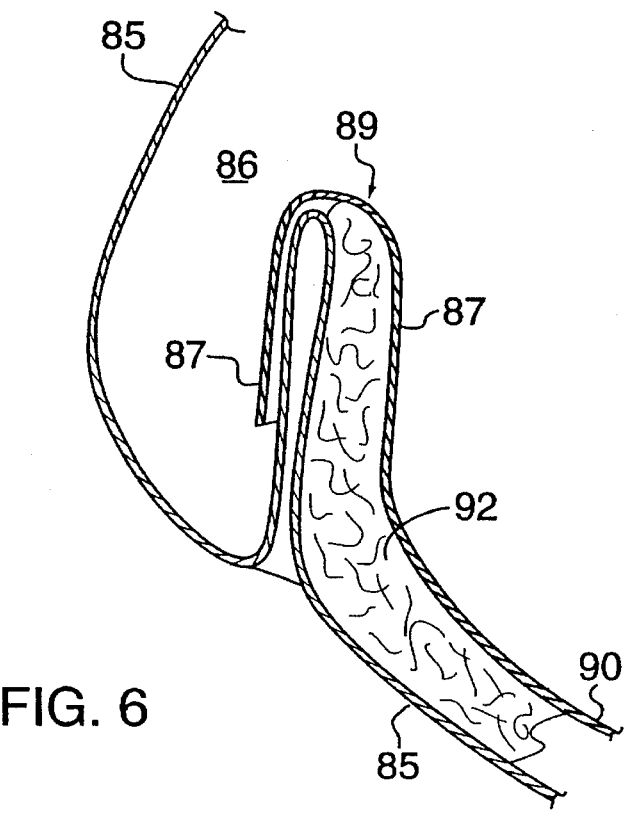
FIG. 6 is a cross-section corresponding to FIG. 2 of another diaper.

FIG. 6 shows another way of arranging the various components of a dog-diaper. The thin waterproof plastic sheet 85 is doubled over into a Z-fold to form the pocket 86. The liquid-passing material 87 covers the lip area 89 of the pocket, and extends over the lower area 90 of the sheet 85, comprising the front cover of the pocket, and below the pocket. The highly-absorbent material 92 is located between the sheet 85 and the material 87.

FIG. 6 shows the configuration of the components at a point midway between the stitched edges, there being no stitching at this midpoint, and shows the components simply folded together. The lip 89 of the pocket is stiffened by the presence of the thick bulk of the material 92.

Figure 7:
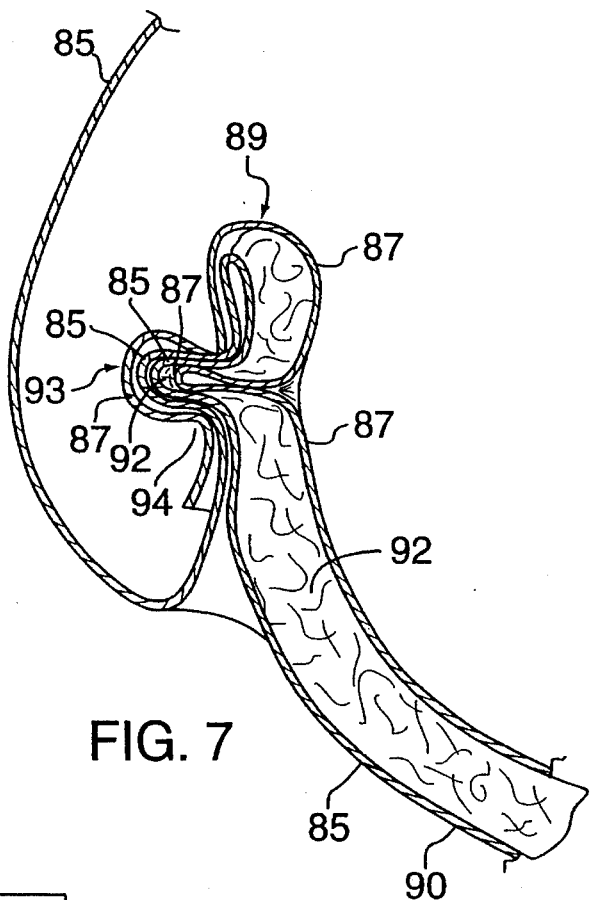
FIG. 7 is a cross-section corresponding to FIG. 6 of another diaper.
Figure 8:
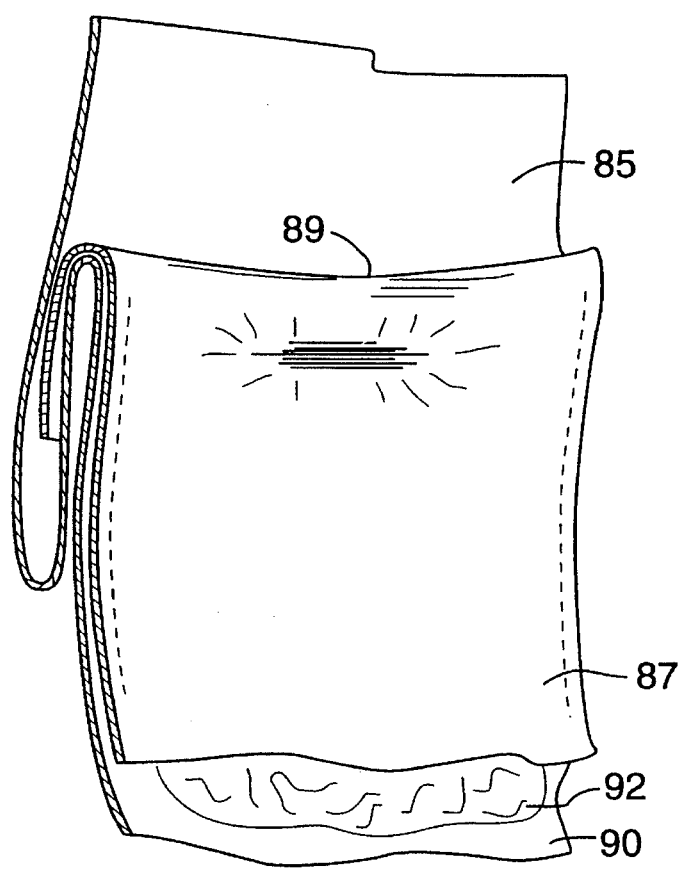
FIG. 8 is a front elevation of the diaper of FIG. 7.

FIGS. 7 and 8 show a development of FIG. 6. In FIGS. 7 and 8, the components from which the diaper is made are the same as in FIG. 6. An area of the front cover 90 of the pocket 86, just below the lip 89 of the pocket, is pinched. All the components are pinched together, being the two thicknesses of the waterproof sheet 85, the two thicknesses of the permeable material 87, and the bulk of the absorbent material 92. The pinched loop 93 is stitched at 94.

The pinch extends only over the middle area of the front of the pocket, just below the lip: the pinch does not extend to the marginally-stitched side edges of the pocket. This middle-only extent of the pinch is shown in FIG. 8.

One effect of gathering the middle-only pinch, and stitching same, is to shorten the length of the front cover 90 of the pocket over the middle area of the front cover, while the length of the front cover over the side edges is not shortened. In turn, the effect of shortening only the middle of the front cover is to draw the middle of the lip 89 forwards and outwards, i.e to the right in FIG. 7. This action serves to ensure that the mouth of the pocket is kept well open.

Another effect of the pinch is that the lip is considerably stiffened thereby. The extra stiffness arises because the bulk of the absorbent material is compressed by the pinch, and thereby becomes stiffer, and because the pinched loop 93 provides material lying at an angle to the lip itself 89.

Figure 9:
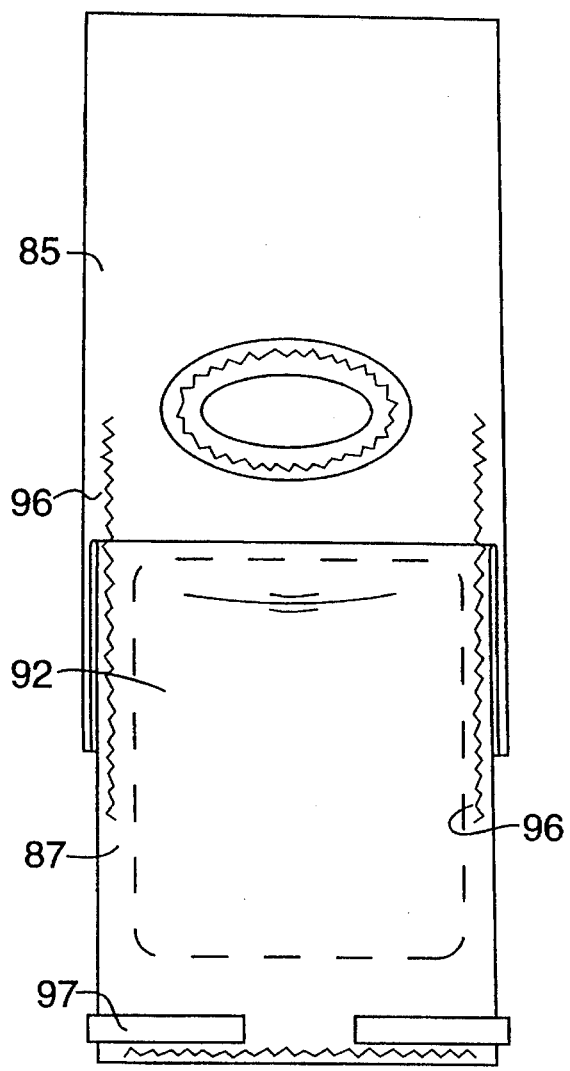
FIG. 9 is a plan of another diaper, in which elastic stitching is shown in a stretched-flat condition.

As shown in FIG. 9, the diaper is rectangular in shape. In fact, very little stitching is required: elastic stitching is provided where indicated by the wavy lines 96 in FIG. 9, i.e down the side edges and laterally across the bottom edge. Apart from the pinch, no straight stitching is needed.

The hole for the dog's tail may be surrounded by glued or stitched elastic tape, for added strength.

Figure 10:
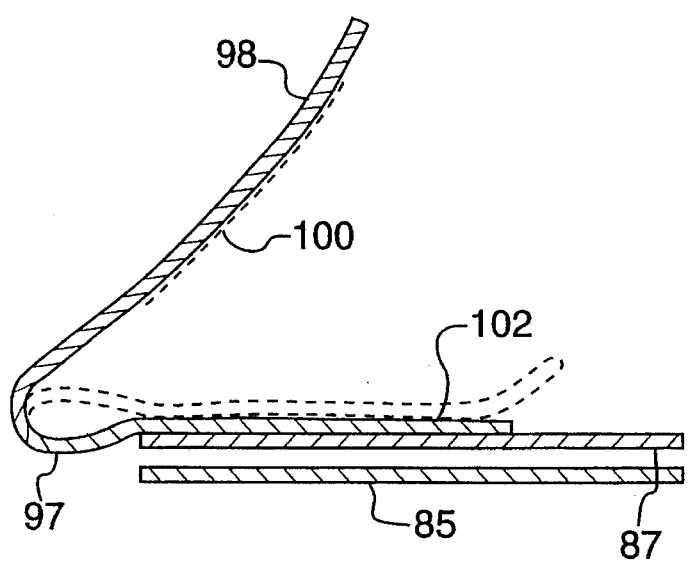
FIG. 10 is a cross-section of a component of the diaper of FIG. 9.

Sticky tabs 97 are provided for the purpose of securing the diaper around the dog's waist. FIG. 10 shows a sticky tab 97 in detail. The flap 98 of the tab has adhesive on the inside surface 100, which is normally protected by the fact that the flap is stuck to the portion 102 of the tab. The surface of the portion 102 is such that the flap can be easily peeled off the portion. The adhesive is of the kind that sticks to the plastic sheet material 85 so tightly that, upon contact, the bond is stronger than the plastic. (When removing the diaper from the dog, it is a simple matter to tear the plastic material.)

Figure 11:
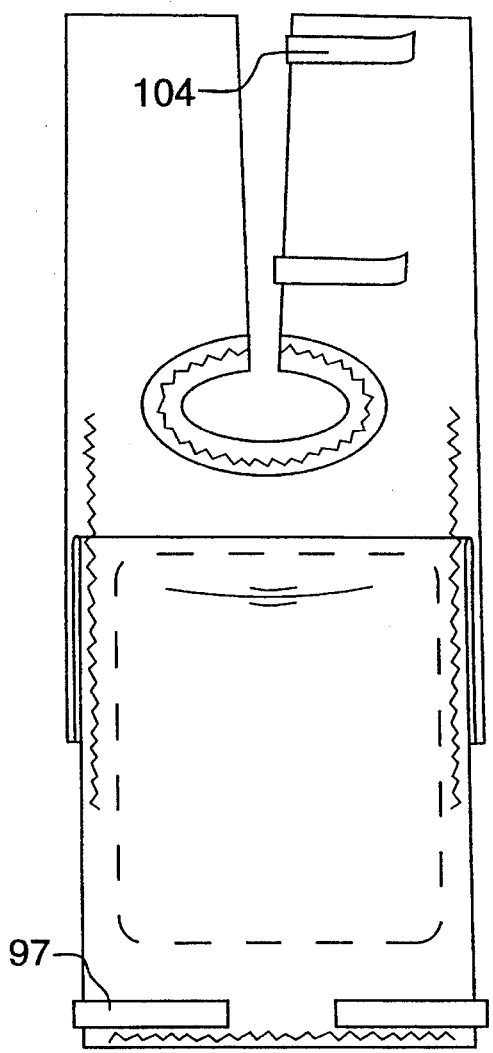
FIG. 11 is a plan of another diaper, corresponding to FIG. 9.

Sometimes, it is not appropriate to pass the dog's tail through the hole in the diaper. In that case, the upper area of the watertight plastic may be slit into two halves, as shown in FIG. 11. Sticky tabs 104 are provided for joining the halves after the diaper is assembled to the dog.

Most dogs do tend to shed the diaper if the diaper is not secured with suspender straps, as mentioned. It will not usually be economical for the straps to be disposed of, along with the soiled diaper. The straps should be of elastic material, although non-elastic straps may be used if adjustability of fit is provided for. The straps may be adapted to be attached to the dog's collar or walking harness, or the straps may include a loop for fitting over the dog's head, independent of the collar.

The straps may be secured to the disposable diaper using Velcro, sticky tabs, buttons, tapes, etc, as mentioned.

Figure 12:
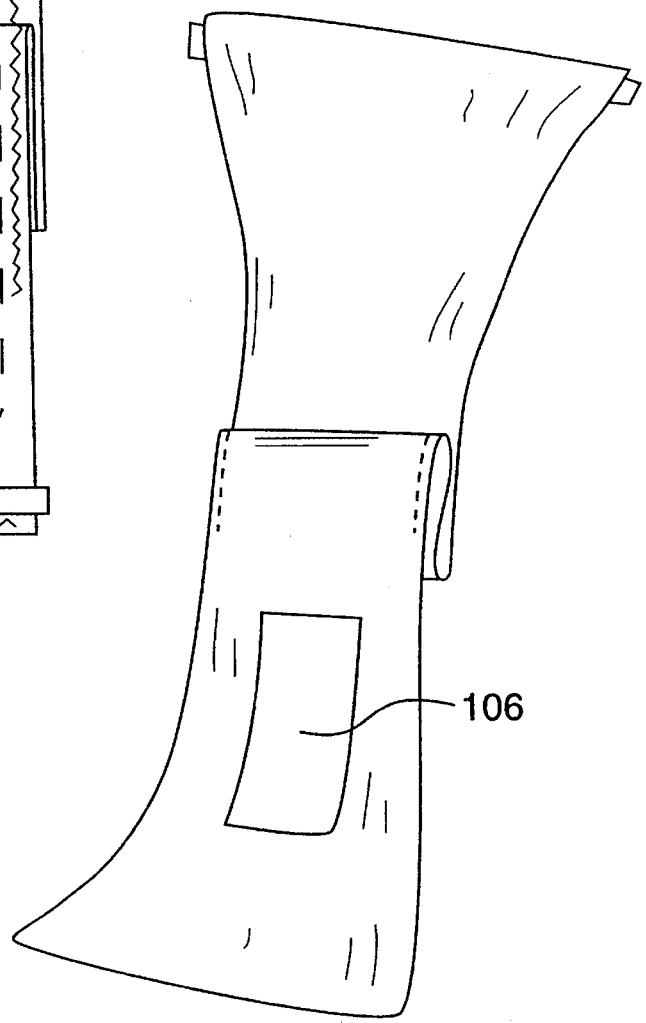
FIG. 12 is a pictorial view of another diaper.

Although the diapers as described so far have included the absorbent material, for absorbing liquid excrement, it is contemplated that the diaper may comprise only the solid piece of excrement-receiving pocket. FIG. 12 shows such a diaper. No absorbent material, and no liquid-permeable material, are used. The diaper includes a cut-out 106 in the plastic sheet material, whereby liquid excrement from the dog does not touch the diaper.

Figure 13:
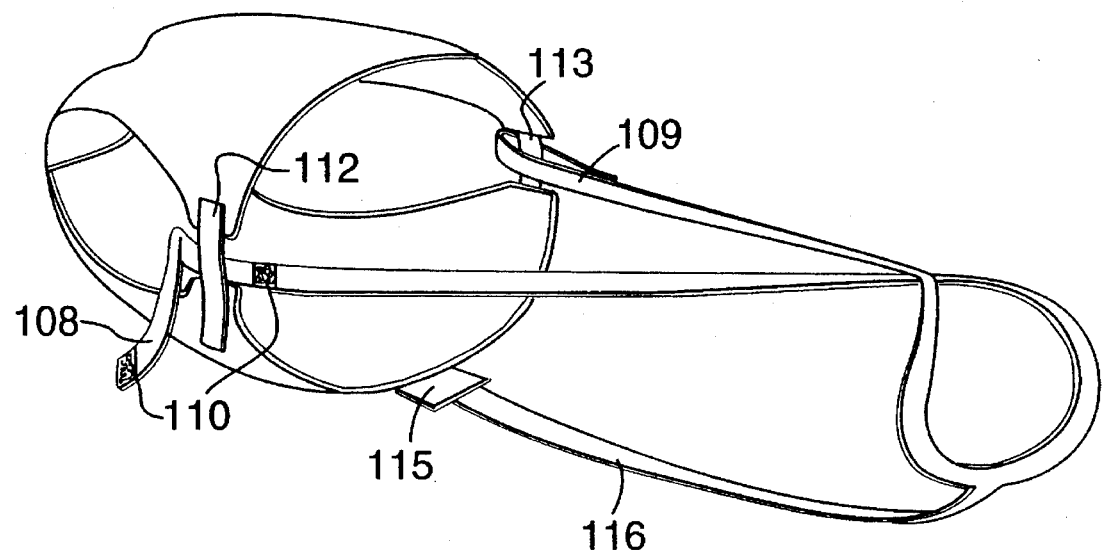
FIG. 13 shows an arrangement of straps for holding the diaper on the dog.

FIG. 13 shows a preferred arrangment of straps. The two side-straps have respective loop-portions 108,109 on the end. Each loop-portion includes a tag which may be Velcro'd (at 110) to the strap to secure the loop.

For assembly, the person first attaches the diaper around the dog, assembling the two (sticky) side-tabs 112,113. The loop-portion of the strap is passed around the side-tab.

The diaper may be provided with a sticky tab 115, by means of which a single under-strap 116 is attached to the diaper, prior to assembling the diaper onto the dog.

This three-point strap system is very secure, and is easily assembled, even to an excited dog, and yet the disposable diaper can be formed very inexpensively. The straps require Velcro (or buttons, tie-tapes, etc), to secure the loop, but the straps can be used many times. It is the diaper that can be used only once.

In this specification, expressions of orientation, including front-rear, left-right, etc, are expressed in relation to the dog, when the diaper is in place upon the dog.

I claim:

1. Disposable diaper for a dog or other animal, wherein:

the diaper is of such a structure as to be suitable for placement upon the dog;

the diaper includes a means for constraining the diaper as to its position with respect to the tail of the dog;

the diaper includes a sheet of thin waterproof plastic material; the sheet includes an area which is suitable for placement between the back legs of the dog;

the sheet is formed with a Z-fold, comprising an upper fold and a lower fold and an intermediate area of the sheet between the two folds;

the upper fold divides the intermediate area from an overlying area of the sheet, and the lower fold divides the intermediate area from an underlying area of the sheet;

the line of the upper fold lies in the lateral or transverse right-left direction;

the diaper includes left and right lines of stitching extending in the longitudinal front-rear direction, and lying across the upper fold;

at the lines of stitching, the intermediate area of the sheet, including the upper fold, is stitched to the underlying area;

the left and right lines of stitching are spaced apart laterally, whereby an unattached portion of the upper fold is defined between the lines of stitching, being an area in which the upper fold is not attached to, but is separable from, the underlying area of the sheet;

the arrangement of the Z-fold is such that the intermediate area of the sheet and the underlying area form between them a pocket;

a mouth of the pocket is defined as the area between the unattached portion of the upper fold and the underlying area of the sheet, whereby the upper fold comprises a lip of the said mouth;

the pocket, and the mouth thereof, are so positioned in the diaper as, in use of the diaper on a dog, to receive solid excrement excreted by the dog.

2. Disposable diaper for a dog or other animal, wherein:

the diaper is of such a structure as to be suitable for placement upon the dog;

the diaper includes a means for constraining the diaper as to its position with respect to the tail of the dog;

the diaper includes a sheet of waterproof plastic material;

the diaper is formed with a pocket, comprising a front cover and an underlying rear cover, the rear cover of the pocket being formed in and of the plastic material;

the front cover has an upper extremity, which extends in the lateral or transverse right-left direction;

the diaper includes left and right lines of stitching extending in the longitudinal front-rear direction, and lying across the upper extremity;

at the lines of stitching, the front cover of the pocket, including the upper extremity, is stitched to the underlying rear cover;

the left and right lines of stitching are spaced apart laterally, whereby an unattached portion of the upper extremity is defined between the lines of stitching, the portion being an area in which the upper extremity is not attached to, but is separable from, the underlying area of the rear cover;

a mouth of the pocket is defined as the area between the unattached portion of the upper extremity of the front cover of the pocket and the underlying area of the sheet, whereby the upper extremity comprises a lip of the said mouth;

the pocket, and the mouth thereof, are so positioned in the diaper as, in use of the diaper on a dog, to receive solid excrement excreted by the dog.

3. Diaper of claim 1, wherein the diaper includes a cover of liquid-permeable fabric material, and includes a thick pad of liquid-absorbent material, and wherein the pad lies sandwiched between the said overlying area of the sheet and the cover.

4. Diaper of claim 3, wherein the thick pad of liquid-absorbent material extends into the upper fold, and serves to stiffen the upper fold.

5. Diaper of claim 1, in which the diaper includes a means for making the upper fold or lip stiff, while the diaper is so configured that the pocket is loose and baggy.

6. Diaper of claim 1, wherein the sheet in which the Z-fold is formed is a continuous, unitary, single piece of material.

7. Diaper of claim 1, in combination with diaper-holding-straps, wherein the straps are so structured as to be effective, upon securement around the dog, to draw the upper fold or lip of the mouth of the pocket forward, away from the underlying area of the sheet, and into contact with the dog's skin, forward of the anal region.

8. Diaper of claim 1, wherein:

the diaper is so configured as to include an over-portion of the diaper which is extendable over the dog's back, and an under-portion of the diaper which is extendable underneath the dog;

the diaper includes operable left and right side fasteners, which are effective, when operated, to fasten left and right extremities of the portions together.

9. Diaper of claim 8, wherein:

the operable side-fasteners include means for releasing the fasteners and for thereby releasing the diaper from the dog after use;

the said means for releasing the diaper is so configured as to be operable by a person's hands and fingers, the means being so structured that the hands and fingers remain several centimeters from the pocket during the release;

and the said means are so configured that the diaper can be picked up and carried away for disposal while the hands and fingers remain so spaced from the pocket.

10. Diaper of claim 8, in combination with diaper-holding-straps, wherein:

the side-fasteners are so configured that, when in use to fasten the said extremities together, a space remains between the over- and under-portions;

the straps include left and right loop-portions, and include operable loop-fasteners, which are effective, when operated, to lock the loop-portions into enclosed loops;

and the straps are so configured that the loop-portions can be assembled, through the spaces, into enclosed loops around the side-fasteners, thereby attaching the straps to the diaper.

11. Diaper of claim 1, wherein the lines of stitching are disposed along the marginal edges of the sheet.

12. Diaper of claim 10, wherein the straps include left and right side straps carrying the left and right loop-portions, and also an under-strap, and the diaper includes a means for attaching the under-strap to the under-portion of diaper.

13. Diaper of claim 1, wherein the stitching is of stretched elastic thread, whereby, upon contraction of the elastic thread, the material stitched becomes bunched, gathered, and pleated.

14. Diaper of claim 4, wherein the diaper includes a line of stitching adjacent to the lip, in which the stitching is effective to stiffen the lip and to bias the lip in the direction to open the mouth of the pocket.

15. Diaper of claim 1, wherein the means for constraining the diaper with respect to the dog's tail comprises a tail-receiving hole in the upper portion of the waterproof sheet.

16. Disposable diaper for a dog or other animal, wherein:

the diaper is of such a structure as to be suitable for placement upon the dog;

the diaper includes a means for constraining the diaper as to its position with respect to the tail of the dog;

the diaper includes a sheet of thin waterproof plastic material;

the sheet includes an area which is suitable for placement between the back legs of the dog;

the sheet is formed with a Z-fold, comprising an upper fold and a lower fold and an intermediate area of the sheet between the two folds;

the upper fold divides the intermediate area from an overlying area of the sheet, and the lower fold divides the intermediate area from an underlying area of the sheet;

the line of the upper fold lies in the lateral or transverse right-left direction;

the diaper includes left and right lines of attachment extending in the longitudinal front-rear direction, and lying across the upper fold;

at the lines of attachment, the intermediate area of the sheet, including the upper fold, is attached to the underlying area;

the left and right lines of attachment are spaced apart laterally, whereby an unattached portion of the upper fold is defined between the lines of attachment, being an area in which the upper fold is not attached to, but is separable from, the underlying area of the sheet;

the arrangement of the Z-fold is such that the intermediate area of the sheet and the underlying area form between them a pocket;

a mouth of the pocket is defined as the area between the unattached portion of the upper fold and the underlying area of the sheet, whereby the upper fold comprises a lip of the said mouth;

the pocket, and the mouth thereof, are so positioned in the diaper as, in use of the diaper on a dog, to receive solid excrement excreted by the dog.

17. Disposable diaper for a dog or other animal, wherein:

the diaper is of such a structure as to be suitable for placement upon the dog;

the diaper includes a means for constraining the diaper as to its position with respect to the tail of the dog;

the diaper includes a sheet of waterproof plastic material;

the diaper is formed with a pocket, comprising a front cover and an underlying rear cover, the rear cover of the pocket being formed in and of the plastic material;

the front cover has an upper extremity, which extends in the lateral or transverse right-left direction;

the diaper includes left and right lines of attachment extending in the longitudinal front-rear direction, and lying across the upper extremity;

at the lines of attachment, the front cover of the pocket, including the upper extremity, is attached to the underlying rear cover;

the left and right lines of attachment are spaced apart laterally, whereby an unattached portion of the upper extremity is defined between the lines of attachment the portion being an area in which the upper extremity is not attached to, but is separable from, the underlying area of the rear cover;

a mouth of the pocket is defined as the area between the unattached portion of the upper extremity of the front cover of the pocket and the underlying area of the sheet, whereby the upper extremity comprises a lip of the said mouth;

the pocket, and the mouth thereof, are so positioned in the diaper as, in use of the diaper on a dog, to receive solid excrement excreted by the dog.

* * * * *